April 11, 1950         J. A. C. MALCHUS         2,503,752
LAP WOUND ARMATURE AND METHOD OF WINDING IT
Filed July 31, 1946                        3 Sheets-Sheet 1

INVENTOR
Johannes Andries Christian Malchus
BY   E. Freeman
ATTORNEY.

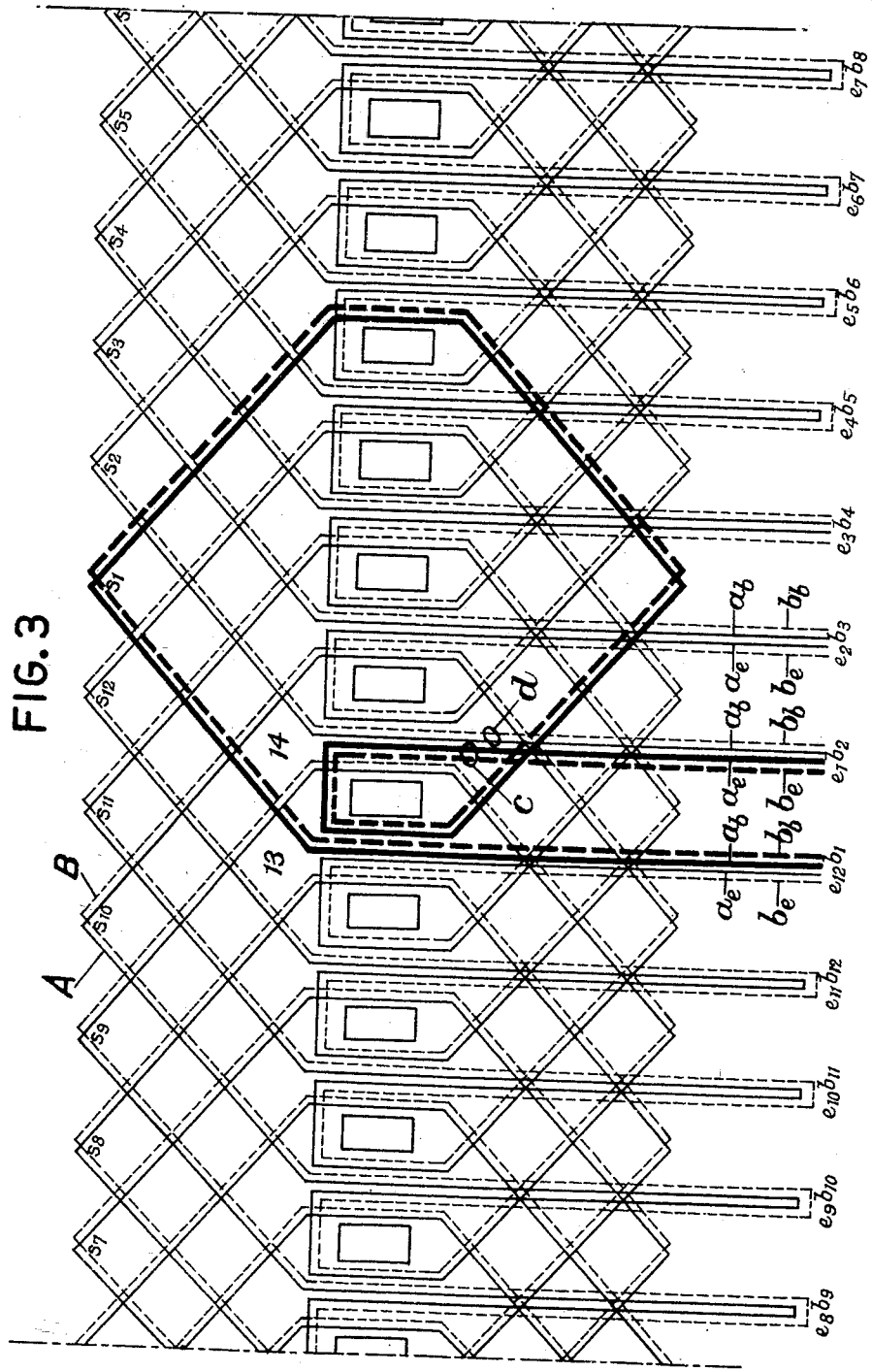

April 11, 1950      J. A. C. MALCHUS      2,503,752
LAP WOUND ARMATURE AND METHOD OF WINDING IT
Filed July 31, 1946      3 Sheets-Sheet 3
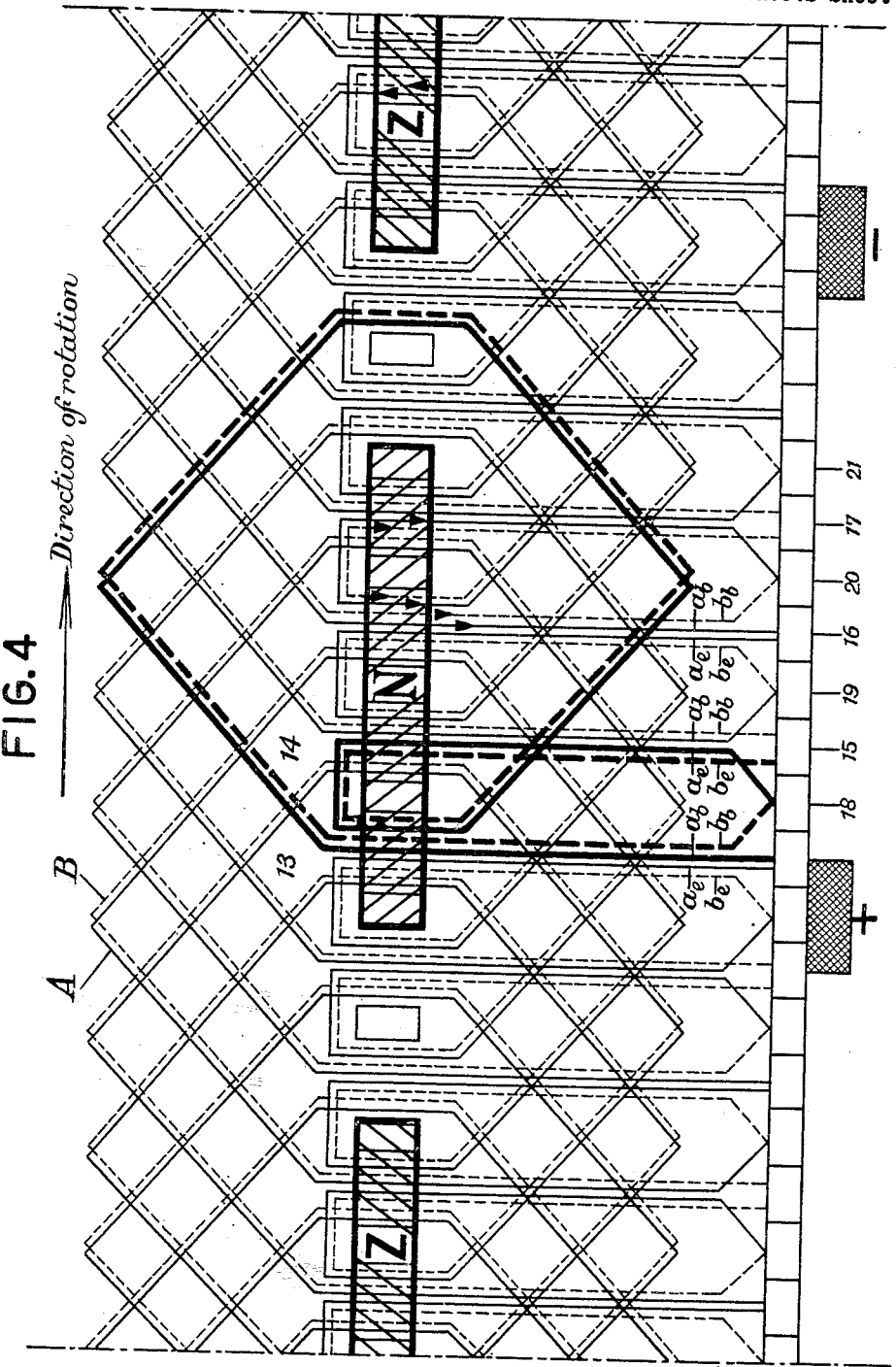
INVENTOR
JOHANNES ANDRIES CHRISTIAAN MALCHUS
BY
ATTORNEY Patented Apr. 11, 1950

2,503,752

UNITED STATES PATENT OFFICE 2,503,752

LAP WOUND ARMATURE AND METHOD OF WINDING IT

Johannes Andries Christiaan Malchus, Amsterdam, Netherlands

Application July 31, 1946, Serial No. 687,418
In the Netherlands March 6, 1943

Section 1, Public Law 690, August 8, 1946
Patent expires March 6, 1963

3 Claims. (Cl. 171—206)

The invention relates to armatures for dynamo-electric machines and relates more particularly to the manufacture of lap wound armatures of the type having a cone with open slots wherein the width of each coil is a multiple of the pitch of the slotted core.

In the winding of armatures, as it has been practiced heretofore, there was always the danger present of fraying and stripping the insulation from the wires during the winding while proceeding from one slot to an adjacent one on the core. Such fraying of the wire insulation or other damage to the wire often resulted in a short circuit in the coils necessitating a complicated repair operation. Furthermore, the conventional winding method of the prior art rendered difficult the selection of the ends of the wire to be subsequently connected to the armature commutator.

It is, therefore, one of the principal objects of the invention to provide for an improved wound armature and method of winding the same to avoid the deficiencies of the prior art.

Another object of the invention is to provide for certain steps in the winding method to facilitate the subsequent selection of wire terminals for connection to the commutator bars.

A further object of the invention is to provide for a winding method that will enable semi-skilled or even unskilled operators to wind an armature.

A still further object is to provide such a wound armature the winding of which may be carried out easily and simply and wherein the requirement for repair is reduced to a minimum.

Other objects of the invention will in part be obvious and will in part appear hereinafter.

With the above and other objects of the invention in view, the invention consists in the novel methods, construction, arrangement and combination of various devices, elements and parts, as set forth in the claims hereof, one embodiment of the same being illustrated in the accompanying drawings and described in the specification.

In the accompanying drawings:

Fig. 3 is a diagram illustrating the winding process of Fig. 2; and

Fig. 4 is a diagram similar to that of Fig. 3 showing also the commutator bars and field poles.

Some of the disavantages of the prior art have been referred to in the foregoing. A conventional winding of an armature, in accordance with one process of the prior art, will now be discussed more fully before proceeding with the description of the present invention and improvements.

Figure 1:
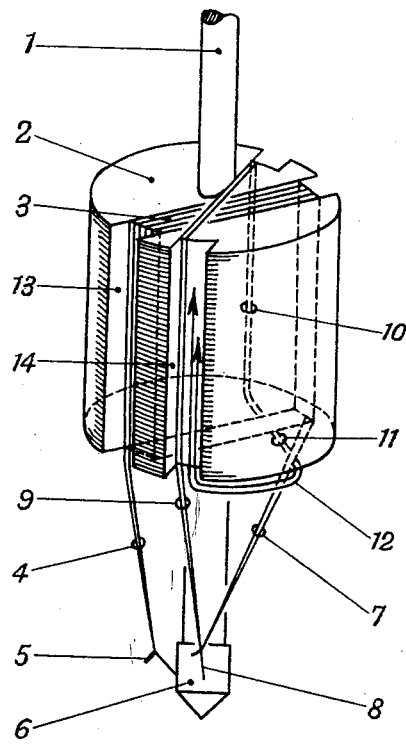
Fig. 1 is a schematic view, in perspective, of an armature that is wound in accordance with the teachings of the prior art.

One process of winding that has heretofore been used is illustrated in Fig. 1. A core 2 is carried on a shaft 1. The core 2 is provided with a series of parallel slots in its periphery (only some of which are illustrated) that are parallel to the axis of the core 2 and extend throughout the length thereof, two of these grooves having been designated 13 and 14, respectively. An element 6 that may be termed a spider, is removably mounted on one end of the shaft 1 and is provided with a plurality of hooks in alignment with the slots, two of the hooks, being designated 5 and 8, are disposed in alignment with the slots 13 and 14.

The spider 6 is located on the commutator side of the core 2 and, after the winding is completed, the spider 6 will be removed from the shaft and be replaced by the commutator. The winding of this conventional armature is done as follows: two insulated wires are wound parallel upon the core simultaneously, as shown in Fig. 1, to form a coil 3 that is formed of many loops and is disposed in the slot 13 and a second slot opposite thereto and extends along the end surfaces of the core 2. Two of the parallel wire portions 4 of the coil 3, that lead to the slot 13 and may be termed "beginning" wires, are connected to the hook 5, and the two parallel wire portions 7 of the coil 3 that lead from the opposite slot, and may be termed "end" wires, are carried over the hook 8. The end wires 7 are bent backwards at the hook 8 and are led, as beginning wires 9, from there to the slot 14 that is adjacent the slot 13. The wires 9 are the beginning wires of a coil 10 which is disposed in the slot 14 and a second slot opposite thereto and partly overlap the coil 3 along the end surfaces of the core 2.

As clearly shown in Fig. 1, the end wires 11 of the coil 10 must be led over the end wires 7 of the coil 3 in order to be brought back into the slot 14 to form another loop of the coil 10. The winding of the end wires 11 will put the end wires 7 under tension and will draw the latter, as indicated at 12, inwardly towards the shaft. The wires 7, therefore, will be stretched and may easily break and their insulation be frayed or stripped, which may result in a short circuit of the coil.

This method makes it also very difficult to select, after the wires have been cut off the spider, the proper wire terminals for connection to the commutator, since the wire terminals will have been moved towards the shaft and will thus not be easily discernible at the point where they leave the slot.

In order to obviate these difficulties, it has been proposed in the prior art to cut the wires at the beginning and at the end of the coils before the lapping thereof takes place that is brought about by the other coils, and to bend these terminals outwardly to extend from the exterior of the core. This, however, has the disadvantage that these outward bent terminals hinder the winding of the succeeding coils and are often moved away from their bent position by the succeeding coil winding. To prevent such entangling, these wire terminals have been cut at different lengths. Any error in selecting the right wires for the shorter cutting, however, requires repair operations of an extremely difficult type.

Figure 2:
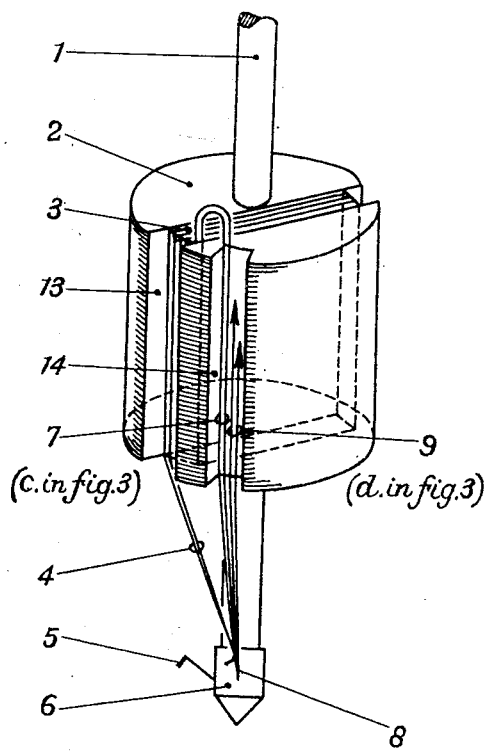
Fig. 2 is a schematic view, in perspective, showing an armature similar to that of Fig. 1, but wherein the winding is carried out in accordance with the present invention.

In accordance with the instant invention, all these deficiencies of the prior art are avoided, as will be presently explained in detail, and as illustrated in the remaining views, Figs. 2 to 4.

In Fig. 2, a core is shown that is again designated 2 and that is mounted on a shaft 1. Parallel slots are again provided in the periphery of the core 2 and extend between the end surfaces thereof, not all the slots being illustrated, however, and two slots have been indicated 13 and 14. A spider 6 is again removably mounted on the commutator receiving end of the shaft 1 and is provided with hooks, two hooks that are opposite the slots 13 and 14 having again been designated 5 and 8, respectively. Two wires, for instance a black colored wire A and a red colored wire B (see Figs. 3 and 4) are wound, in one winding direction, in loops forming a coil 3 that is disposed in the slot 13 and a slot opposite thereto, and wire portions 4, herein termed the "beginning" wires, are connected to the hook 8 and these wires 4 that extend from one end of the coil 3 constitute the beginning of that coil.

The wire portions 7 at the opposite end of the coil, herein termed "end" wires, leave the slot 13 at the point where the slot intersects with the end surface of the core which end surface is opposite relative to the commutator end of the shaft. These end wires 7 are thence bent backwards and are led into the adjacent slot 14 in a direction opposite to the winding direction of the coil 3. From there the end wires 7 are led to the hook 8 and are again bent backwards at the hook 8 to re-enter the slot 14, as beginning wires 9 of the following coil, but this time in a direction parallel to the said winding direction of the coil 3.

In accordance with the invention, each coil is composed of a plurality of wires, for instance of two wires that are wound parallel in many loops or windings, for instance 50 windings, and each coil has in this instance two "beginning" wires and two "end" wires that lead to and from the coil, respectively, and extend from the coil to a spider hook.

After the winding has been completed in accordance with the foregoing, the wires that are connected to the hooks of the spider 6 are severed by any suitable severing operation, and the resulting wire terminals are left loosely extending from the slots (as best shown in Fig. 3) for subsequent connection to the bars of the commutator, as will be disclosed hereinbelow. The beginning wires and the end wires of each coil will become "beginning terminals" and "end terminals" after the severing operation.

In Figs. 3 and 4, black colored wire is indicated with the letter A and red colored wire is indicated with the letter B to indicate by way of exemplification the two wires that are wound together during the winding operation. The "beginning" terminals of black wire are termed $a_b$ and "end" terminals thereof $a_e$; conversely the "beginning" terminals of red wire are indicated with $b_b$ and the "end" terminals thereof with $b_e$. As shown in Figs. 2 and 4, the end terminals $a_e$ and $b_e$ of one coil are disposed in the slot 14, and also the beginning wire terminals $a_b$ and $b_b$ of an adjoining (second) coil are disposed together in the slot 14.

From the diagrammatic showing in Fig. 3 it may be discerned that it will be easy to connect the coils in series and also to connect them with the corresponding bars of the commutator—after the spider 6 has been replaced by a commutator—by selecting, in starting the connecting operation, any two adjacent terminals of one color, for instance the two red wire terminals $b_e$ and $b_b$ that emanate from one slot, for instance from the slot 14, and to connect them, as shown in Fig. 4, with the corresponding bar 15 of the commutator that is disposed opposite the slot 14.

Then, the black wire ends $a_e$ and $a_b$ of the adjacent slot that is opposite the bar 16 may likewise be connected to the said bar 16, and thereafter the two red wire ends $b_e$ and $b_b$ that extend from the next adjoining slot which is opposite the bar 17, be connected to said bar 17. This may be continued until all the bars opposite slots have wire terminals connected, alternately two black and two red terminals being so connected.

In connecting the two red wire terminals $b_e$ and $b_b$ from the slot 14, there remain two black wire terminals, one of which then will be bent manually by the operator to one side to be connected with the bar 18 that is disposed on one side of the bar 15, and the other black terminal will be bent to the other side and be connected to the bar 19 that is disposed on the opposite side of the bar 15 between the bars 15 and 16. The remaining red color wire ends $b_e$ and $b_b$, of the adjoining slot that is opposite the bar 16 will be connected in a corresponding way, with the bars 19 and 20, respectively. In this manner all the coils are finally connected in series.

The selection as to which of the remaining wire terminals should be bent and connected at one side and which at the opposite side of the corresponding commutator bar, is made by the operator by observing the position at which the terminals emerge from the slot. It may be possible, however, to make the "beginning" terminals in any suitable manner (not shown) to distinguish them from the "end" terminals.

By the previously mentioned change of winding direction to which the wires are subjected as they leave one slot to enter an adjacent slot for the run towards the spider hook, an opposing electrical momentum will be created by these wires when the armature is put to use. However, this opposing momentum is negligibly small in comparison with the normally directed momentum due to the large amount of loops or windings that make up each coil. Furthermore, armatures made in accordance with the invention are most efficient in use in small dynamo-electric machines in which the "false half-turn" hereof has no appreciable influence on the so-called filling factor of the slots.

Certain of the advantages of the invention have already been herein referred to. It may be useful, however, to allude particularly at this point to the advantage of rendering it possible to utilize one spider hook for several slots, for instance for three slots, whereby the chances are diminished of winding wires on a wrong hook.

Furthermore, since the wire terminals do not cross each other, any required repair can be carried out simply and with a minimum of rewinding. Moreover, since the beginning and end terminals are adjacent each other in one slot, the connecting operation to the commutator bars is simplified and consumes only a minimum of time.

It will be apparent to those skilled in the art that the novel principles of the invention disclosed herein in connection with a specific exemplification thereof will suggest various other modifications and applications of the same. It is accordingly desired that in construing the breadth of the appended claims they shall not be limited to the specific exemplification of the invention described herein.

Having thus described the invention, what I claim as new and desire to be secured by Letters Patent, is as follows:

1. In an armature winding, for use in connection with a slotted core and a commutator coaxially disposed adjacent one end of said core, said armature winding comprising in combination, a plurality of coils overlapping each other at the ends of the said core, and each coil disposed in two substantially opposite slots, and each coil composed of a plurality of substantially parallel wound wires, two wire terminals formed on each wire and disposed at opposite ends of said coil and one of said terminals of each wire extending in one direction from one of said slots wherein the coil is disposed and the other terminal extending in the same direction from a slot adjacent to said one slot, whereby the said first terminals of one coil and the said second terminals of an adjacent coil extend in the same direction from a slot for connection to said commutator.

2. In a method of winding an armature on a slotted core including two opposite end surfaces and a shaft and a spider removably connected to said shaft facing one end surface of said core and including a plurality of hooks, the steps comprising winding two parallel wires, each having a different color, in one direction into a coil disposed between two opposite slots of said core and connecting one portion of each wire at the beginning of said coil to a hook to extend between said hook and one of said opposite slots and leading wire portions forming the other ends of said coil into a slot adjacent said one slot in a direction opposite to said first direction after bending said last named portions backwards about a part of an end surface of said core extending between said adjacent slots and disposed opposite the spider facing end surface, connecting the said last named portion of each wire to a spider hook and subsequently returning said portion to said second slot to form a beginning of a second coil disposed in said second slot and a slot opposite thereto, repeating that operation until coils are wound in each two opposite slots of the core in the said manner, thereafter severing the wire portions connected to said hooks to provide wire terminals, subsequently replacing said spider with a commutator having parallel bars, and finally connecting said wire terminals to said commutator, in series, by securing at each alternate slot two wire terminals of one color, and at each slot therebetween two terminals of the other color, to a bar opposite a slot and securing the remaining two wires of each slot to two bars disposed adjacent the said one bar, so that each remaining wire of a slot will be connected to a different adjacent bar.

3. The method of winding an armature for a commutator on a slotted core having tooth edges between said slots and being provided with a shaft and a hook-carrying spider temporarily attached to the said shaft comprising the steps of winding a pair of wires across a first slot of said core to complete a coil, conducting the wire endings of said coil over a toothed edge adjacent said first slot directly into an adjacent slot, leading the wires in an opposite direction to the winding direction of said first coil through said slot onto a hook of the spider, returning the wires into the same slot and completing the winding of the second coil, repeating this procedure until all coils are wound, severing the wires from said spider, connecting of the four wire endings of each slot the wire ending of one coil and the corresponding commencing wire of an adjacent coil with the commutator bar located oppositely to said first slot, and connecting the remaining wire ends to the commutator bars located on both sides of said first bar.

JOHANNES ANDRIES CHRISTIAAN MALCHUS.

REFERENCES CITED

The following references are of record in the file of this patent:

UNITED STATES PATENTS

| Number | Name | Date |
|---|---|---|
| 1,661,332 | Gomory | Mar. 6, 1928 |